May 26, 1959
G. A. MARSH ET AL
2,888,642
APPARATUS FOR DETERMINING THE PITTING RATE
OF A CORROSIVE MEDIUM ON A METAL
Filed May 9, 1957
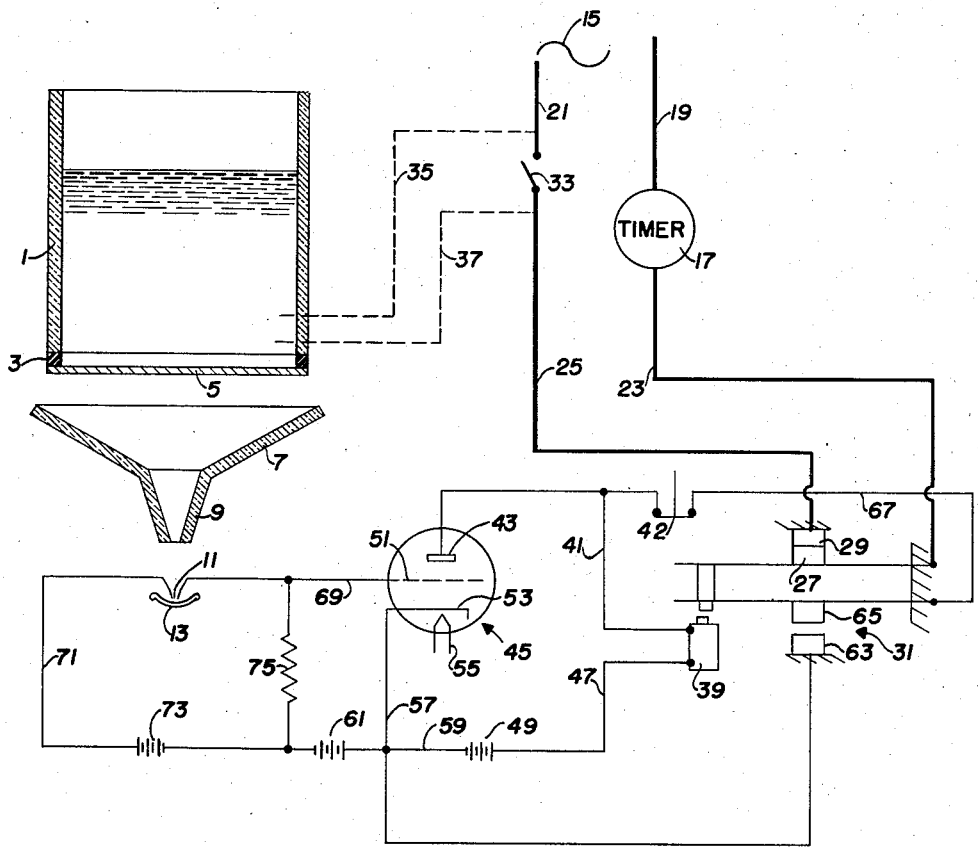
INVENTORS
GLENN A. MARSH
EDWARD SCHASCHL
BY
*Edward H Lang*
ATTORNEY

United States Patent Office 2,888,642
Patented May 26, 1959

2,888,642

APPARATUS FOR DETERMINING THE PITTING RATE OF A CORROSIVE MEDIUM ON A METAL

Glenn A. Marsh and Edward Schaschl, Crystal Lake, Ill., assignors to The Pure Oil Company, Chicago, Ill., a corporation of Ohio Application May 9, 1957, Serial No. 658,151

6 Claims. (Cl. 324—71)

This invention relates to new and useful improvements in apparatus for recording and measuring the rate of corrosion of a corrosive liquid on a metal and, more particularly, the rate of pitting of a corrosive liquid on a metal.

In the past, numerous methods have been devised for measuring the rate of corrosion of corrosive liquids on metals. These have included such techniques as contacting the metal with corrosive liquid and periodically measuring the change in thickness thereof. Other methods have used techniques in which the amount of metal dissolved in a corrosive liquid was measured and the rate of corrosion thereby obtained. These prior art techniques, however, have not taken into account the effect of pitting or irregular corrosion of small spots or areas of metals. Thus, a change in weight or thickness of the metal being corroded might indicate a relatively slow rate of corrosion while in fact the corrosive liquid was pitting completely through the metal at various localized points. There has, therefore, developed a need for an apparatus or method for measuring accurately the rate of corrosion of metals by corrosive liquids which will also give an accurate measure of the rate of pitting.

It is, therefore, one object of this invention to provide a new and improved apparatus for measuring the rate of corrosion of metal by a corrosive liquid.

Another object of this invention is to provide an improved apparatus for measuring the rate of pitting of a metal by a corrosive liquid.

A feature of this invention is the provision of an apparatus including a container having a wall of the metal to be tested and having an electric circuit arrangement including an electric timer and a switch which is operated in response to contact with corrosive liquid leaking from the container to deenergize the timer and thus indicate the time required for the corrosive liquid to pit through the metal wall.

Other objects and features of this invention will become apparent from time to time throughout the specification and claims as hereinafter related.

In the accompanying drawing, to be taken as a part of this specification, there is shown a schematic diagram of this apparatus for measuring the rate of pitting by corrosive solutions, and which shows in section the container for holding the corrosive solution and the electric circuit timer arrangement for measuring the time required for the corrosive solution to etch through the metal wall of the container.

This invention consists of an apparatus for measuring the rate of pitting of metals by a corrosive liquid which includes a container having a metal wall of the material which is to be tested and arranged to be filled with the corrosive liquid. The container is positioned so that liquid, which may leak therefrom when the metal wall is pitted through, will drop upon an electric switch and deenergize the timer circuit associated with the container, thus measuring the time required for the corrosive liquid to etch through the metal wall.

Referring to the drawings by numerals of reference, there is shown a hollow tubular container 1 which is preferably of glass but which could be of other non-metallic or metallic material which is not affected by the corrosive liquid. Container 1 is provided with sealing gasket 3 which may be of rubber or other suitable corrosion-resistant sealing material. A thin diaphragm or wall 5 of the metal to be tested closes the bottom end of tubular container 1 and is sealed tightly against rubber gasket 3 to prevent leakage of the corrosive liquid from the container. Container 1 may be filled with any suitable corrosive liquid which is desired to be measured by this apparatus. Beneath container 1 there is positioned funnel 7 of a corrosion-resistant material, such as glass, or a corrosion-resistant plastic or metal, and having spout 9 extending downwardly therefrom. Funnel 7 is adapted to receive any liquid which may leak through metal wall 5 when the wall is pitted through by the corrosive liquid, and directs the liquid through spout 9 onto open contacts 11 for controlling the timer circuit associated with this apparatus. The contacts 11 are provided with any suitable receptacle 13 for holding the corrosive liquid received from the funnel in contact therewith.

The timing apparatus and control circuit are connected in circuit with a suitable power source, 15. Timer 17 is provided for measuring the time required for the corrosive liquid to etch through wall 5 of container 1 and may consist of a simple timer motor with a suitable timing indicator and, if desired, a suitable time interval recorder. Timer 17 is provided with an electric circuit consisting of leads 19 and 21 extending to power source 15, and leads 23 and 25 extending to contacts 27 and 29, respectively, of relay switch 31. A switch 33 may be provided for initiating operation of timer 17 or the timer circuit may be provided with auxiliary leads 35 and 37 (shown in dotted line) extending into the interior of container 1 so that the timer circuit is energized by completion of the circuit from lead 35 to lead 37 through the corrosive liquid upon filling of container 1 with the liquid to be tested.

Timer 17 is further controlled by the opening and closing of normally closed contacts 27 and 29 of relay 31. Relay 31 includes relay coil 39 connected by lead 41 to anode 43 of electron tube 45, and by lead 47 to battery 49. Electron tube 45 is provided with control grid 51, cathode 53, and heater 55. Cathode 53 of electron tube 45 is connected by leads 57 and 59 to battery 49 and to battery 61. Lead 57 also extends to fixed contact 63 in relay switch 31. Normally-open contact 65 in relay switch 31 is connected by lead 67 to lead 41 leading from relay coil 39. Control grid 51 of electron tube 45 is connected by lead 69 to one of the normally open contacts 11, the other of which is connected by lead 71 to battery 73. Resistor 75 is connected from point between batteries 61 and 73 to a point on lead 69 between control grid 51 and switch contact 11.

In using this apparatus container 1 is filled with a suitable corrosive liquid for measurement of the rate of corrosion on the bottom wall, 5. The timer circuit is energized either by closing switch 33, or automatically if leads 35 and 37 are used to respond to the presence of corrosive liquid in container 1. When the corrosive liquid in container 1 has etched or pitted a small hole through bottom wall 5 some of the corrosive liquid from the container leaks out, is caught by funnel 7, and directed by spout 9 onto normally-open contact 11. The circuit shown in connection with electron tube 45 and relay coil 39 is a conventional electronic relay circuit except for contacts 11 which are bridged by contact with a drop of the corrosive liquid directed thereon by funnel 7.

The electronic relay circuit shown is inactive until corrosive liquid drops onto contacts 11. When the corrosive liquid bridges contacts 11, the circuit to control grid 51 is energized, thus permitting electron tube 45 to fire and energize relay coil 39. When relay coil 39 is energized, the contact arms thereof are moved downward causing contact 27 to break away from fixed contact 29 and causing contacts 65 to engage fixed contact 63. The engagement of contacts 65 and 63 establishes a holding circuit for relay coil 39 to maintain the same energized, even if electron tube 45 becomes deenergized due to subsequent opening of contacts 11. Reset switch 42 is provided for de-energizing relay coil 39 on starting a new cycle of operation. The opening of switch contacts 27 and 29 causes timer 17 to stop and indicate, and/or record, the timer elapsed since corrosive liquid was placed in container 1. The time thus indicated and/or recorded is a direct measure of the rate of corrosion of the corrosive liquid on metal wall 5, and more particularly is a measure of the rate of pitting of metal wall 5 by the corrosive liquid.

This apparatus has several advantages over previous methods and apparatus for measuring rate of corrosion. As seen from the description of operation, this apparatus measures the rate of pitting rather than uniform corrosion rate over the entire surface of metal being tested. This apparatus is thereby able to give a measure of the maximum rate of penetration of the metal by the corrosive liquid. The apparatus has the further advantage that it can be arranged to start and run automatically. It should be noted that while this apparatus has been illustrated and described with particular reference to an electronic relay control circuit, it could be used with any suitable sensing means which would respond to the presence of corrosive liquid leaking through wall 5 from container 1, and being operable to deenergize the control circuit for timer 17.

Having thus described this invention fully and completely as required by the patent statutes, it should be understood that within the scope of the appended claims this invention may be practiced otherwise than as specifically described.

What is claimed is:

1. An apparatus for measuring the rate of pitting of a corrosive solution on a metal, which includes in combination, a container for a corrosive solution and having at least one wall formed of a sheet of the metal to be tested, an electric timer arranged to be started on filling said container with corrosive liquid, and means positioned adjacent said metal wall of said container and responsive to leakage of corrosive liquid therefrom to stop said timer to indicate the time required for said corrosive liquid to pit through said metal wall.

2. An apparatus for measuring the rate of pitting of a corrosive solution on a metal, which includes in combination, a container for a corrosive solution and having an open bottom adapted to be closed by a sheet of the metal to be tested, an electric circuit having a pair of open contacts positioned below said container, means positioned beneath said container to direct liquid leaking therefrom onto said open contacts to complete the circuit therethrough, an electric timer and circuit therefor arranged to be started on filling said container with corrosive liquid, a normally-closed relay having closed contacts in the circuit of said timer, the coil of said relay being connected in said first-named circuit, whereby the pitting of a hole through the test metal permits corrosive liquid to drip onto said open contacts to complete said first-named circuit and energize said relay to open said closed contacts thereof and stop said timer to indicate the rate of pitting.

3. An apparatus according to claim 2 in which said container is of glass, and said means positioned beneath said container is a glass funnel having its spout positioned to direct drops of corrosive liquid which may leak from said container onto said open contacts.

4. An apparatus according to claim 2 in which said first-named circuit includes an electron tube having a control grid responsive to bridging of said open contacts by a drop of the corrosive liquid and connected in series with said relay coil for energizing the same, and said relay including normally open contacts connected in a holding circuit for the relay coil.

5. An apparatus according to claim 2 which includes means responsive to the filling of said container with a corrosive liquid to energize and initiate operation of said timer.

6. An apparatus according to claim 5 in which said timer circuit includes normally-open contacts positioned in said container so that said timer circuit extends through the liquid in said container and is initially energized in response to the filling of said container with corrosive liquid.

References Cited in the file of this patent

UNITED STATES PATENTS

| | | |
|---|---|---|
| 2,174,053 | Clarke | Sept. 26, 1939 |
| 2,279,121 | Kistler | Apr. 7, 1942 |